(12) United States Patent
Corjon et al.

(10) Patent No.: US 6,719,246 B2
(45) Date of Patent: Apr. 13, 2004

(54) PROCESS AND DEVICE FOR ACCELERATING THE DESTRUCTION OF AT LEAST TWO VORTICES IN THE WAKE OF A MOVING BODY, PARTICULARLY AN AIRCRAFT

(75) Inventors: Alexandre Corjon, Toulouse (FR); Thomas Leweke, Marseilles (FR); Florent Laporte, Villiers sur Tholon (FR)

(73) Assignee: Airbus France, Toulouse (FR)

(*) Notice: Subject to any disclaimer, the term of this patent is extended or adjusted under 35 U.S.C. 154(b) by 0 days.

(21) Appl. No.: 10/080,407

(22) Filed: Feb. 25, 2002

(65) Prior Publication Data

US 2002/0121576 A1 Sep. 5, 2002

(30) Foreign Application Priority Data

Mar. 1, 2001 (FR) .............................. 01 02804

(51) Int. Cl.⁷ .................................................. B64C 1/38
(52) U.S. Cl. ....................................................... 244/199
(58) Field of Search ................................ 244/199, 198, 244/130, 204, 200

(56) References Cited

U.S. PATENT DOCUMENTS

| | | | | |
|---|---|---|---|---|
| 3,776,363 A | * | 12/1973 | Kuethe | 181/213 |
| 3,881,669 A | | 5/1975 | Lessen | |
| 3,904,151 A | * | 9/1975 | Rethorst | 244/199 |
| 3,937,594 A | * | 2/1976 | Ito et al. | 416/223 A |
| 4,176,813 A | * | 12/1979 | Headley et al. | 244/130 |
| 5,209,438 A | * | 5/1993 | Wygnanski | 244/203 |
| 5,253,828 A | * | 10/1993 | Cox | 244/199 |
| 5,449,136 A | * | 9/1995 | Doria Iriarte | 244/199 |
| 5,492,289 A | | 2/1996 | Nosenchuck et al. | |
| 5,564,656 A | * | 10/1996 | Gilbert | 244/217 |
| 6,042,059 A | | 3/2000 | Bilanin et al. | |
| 6,484,971 B2 | * | 11/2002 | Layukallo | 244/130 |
| 6,513,761 B2 | * | 2/2003 | Huenecke | 244/199 |
| 2002/0079405 A1 | * | 6/2002 | Layukallo | 244/130 |

FOREIGN PATENT DOCUMENTS

| | | |
|---|---|---|
| DE | 19909190 | 9/2000 |
| EP | 1145954 | 10/2001 |
| WO | 9900297 | 1/1999 |

OTHER PUBLICATIONS

Doyle, A, "Boeing Technique Leaves Trailing Vortices Behind", Flight International, Reed Business Information, Haywards Heath, GB, vol. 156, No. 4700, p. 12, Oct. 27, 1999.

Leweke, et al., "Cooperative Elliptic Instability of a Vortex Pair", Journal of Fluid Dynamics, vol. 360, pp. 85–119, Apr. 10, 1998.

Meunier, et al., "Three–Dimensional Instability of Two Merging Vortices", Advances in Turbulence VIII, pp. 15–18, 2000.

Search Report dated Nov. 9, 2001.

* cited by examiner

*Primary Examiner*—Charles T. Jordan
*Assistant Examiner*—Stephen A Holzen
(74) *Attorney, Agent, or Firm*—Stevens, Davis, Miller & Mosher, LLP.

(57) ABSTRACT

A device for accelerating the destruction of contra-rotating vortices formed at the rear of wings of a moving body by the merging of at least two co-rotating eddies includes, on each of the wings, at least one perturbator which is positioned in the vicinity of the area of creation of one of the co-rotating eddies associated with the wing. Each of the perturbators generates a periodic perturbation of the flow, which has a wavelength capable of exciting at least one of the instability modes of the corresponding eddy in such a way as to increase the core of the contra-rotating vortex which is created from this eddy, in such a way that the diameter of the core becomes greater than a predetermined proportion of the inter-vortex distance.

10 Claims, 3 Drawing Sheets

PROCESS AND DEVICE FOR ACCELERATING THE DESTRUCTION OF AT LEAST TWO VORTICES IN THE WAKE OF A MOVING BODY, PARTICULARLY AN AIRCRAFT

DESCRIPTION

The present invention relates to a process and device for accelerating the destruction of at least two vortices in the wake of a moving body.

The present invention is applied more particularly, but not exclusively, to an aircraft, especially a transport aircraft.

In this case, the two (or more) vortices to which the present invention is applied are generally created when the aircraft is taking off or landing, and at least one flap, particularly a wing flap, is deployed on each wing of the aircraft. These two vortices are contra-rotating and one of them is created in each of the two wakes of the said wings of the aircraft, each of the said vortices being formed behind the corresponding wing by the merging of at least two co-rotating eddies, one of which is created by the wing tip and the other by the deployed flap. These co-rotating eddies are caused by the pressure gradients existing at the ends of the said aerofoils (wing tip, flap) between the lower and upper surfaces of these aerofoils. The pressure gradient forces the fluid to flow around the end of each aerofoil, creating a rotary movement of the fluid which generates the eddy. In cruising flight, there are also contra-rotating vortices which are generated by the wing tips only, but a device for accelerating their destruction would tend to impose excessive drag.

To avoid any confusion, the following terms will be used in relation to the present invention:
"eddies", denoting the eddy phenomena existing before merging, which will merge with each other; and
"vortices", denoting eddy phenomena caused by the merging of at least two of these eddies.

The two contra-rotating vortices which are created in the wake of the aircraft can be very energetic and can produce a velocity field which is highly destabilizing for a following aircraft (this velocity field is commonly called the "wake turbulence"), and, in particular, may cause a powerful rolling moment and a powerful downward motion of the air. Moreover, they have a significant duration (several minutes), and therefore make it necessary to maintain large separation intervals between aircraft in the vicinity of airports.

A fixed separation grid, based on the weights of the aircraft, is currently used to establish the separation intervals between two aircraft at take-off and landing. Since air traffic is constantly increasing, the frequency of take-offs and landings is thus limited at many airports by excessively large separation intervals.

The object of the present invention is, in particular, to accelerate the destruction of this pair of contra-rotating vortices created in the wake of an aircraft at take-off and landing.

There are various types of known device designed to act on different wake eddies of aircraft.

In particular, the document U.S. Pat. No. 5,492,289 discloses a method for accelerating the destruction of an eddy created in the wake of an aircraft by a wing tip or by a flap carried by a wing. This known document proposes that the trailing edge of the wing or flap be modified in such a way as to modify the distribution of lift along the corresponding wing. Such a modification of the lift causes a faster increase in the diameter of the (wing-tip or flap) eddy and thus accelerates its destruction. However, the efficacy of this method is questionable, particularly as regards its effect on the actual acceleration of the destruction. Moreover, this known solution requires a modification of the wing geometry, which entails practical problems of implementation.

The document U.S. Pat. No. 6,042,059 discloses another system and method for destroying wake eddies of an aircraft more rapidly. This known method entails the use of small aerodynamic surfaces to generate a parasitic eddy designed to initiate the process of destruction of the wake eddies. These small aerodynamic surfaces are streamlined and arranged on the lifting surfaces of the aircraft. However, they have the drawback of increasing the drag.

Additionally, the document WO-99/00297 discloses an active system for destroying the wake eddies of an aircraft. This known system is based on the active excitation of the multiple instabilities of eddies by the movable surfaces of the aircraft wings, but without changing the internal structure of these eddies, and without exciting an internal instability of the cores of these eddies. This known active system is highly complex, since it requires the use of a computer and synchronized commands for moving the ailerons and spoilers in a controlled way during the flight. Consequently, there may be effects on the manoeuvrability of the aircraft, the control of its lift, the stress on its structure and the comfort of passengers. Moreover, the efficacy of this known system has not been proved.

The object of the present invention is to overcome the aforesaid drawbacks. It relates to a process for accelerating the destruction of at least two contra-rotating vortices which are generated in the wake of a moving body, particularly in the wake of an aircraft when the flaps are deployed on the said aircraft, in other words at the take-off and landing stages.

For this purpose, the said process for accelerating the destruction of a pair of contra-rotating vortices which are created in the wake of a moving body having at least two wings, where each wing has at least two lifting surfaces, and which are separated from each other by an inter-vortex distance, each of the said contra-rotating vortices being formed at the rear of the corresponding wing by the merging of at least two co-rotating eddies which are created by the arrangement of the said lifting surfaces of the wing, each of the said co-rotating eddies having a plurality of core instability modes, is characterized in that a periodic perturbation of the flow is generated on each of the said wings, in the vicinity of the area of creation of at least one of the said co-rotating eddies associated with the wing, and in that each of the said periodic perturbations has a wavelength capable of exciting at least one of the said instability modes of the corresponding eddy in such a way as to increase the core of the contra-rotating vortex which is created by the unstable merging of this eddy with the other eddy, so that the diameter of the said core becomes greater than a predetermined proportion of the said inter-vortex distance.

Thus, owing to the periodic perturbations generated according to the present invention, the ratios between the core diameters of the two vortices on the one hand, and the inter-vortex distance on the other hand, become greater than a predetermined critical value, above which the two vortices begin to interact strongly and are rapidly destroyed. This is because, as mentioned above, when this critical value is reached there is an exchange of fluid between the two contra-rotating vortices, with the creation of smaller secondary eddies, which are perpendicular to the axes of the said vortices. This exchange of fluid causes a rapid and marked decrease in the circulation in each vortex, and consequently the disintegration or destruction of the said pair of contra-rotating vortices.

The process according to the present invention therefore makes it possible to reduce the duration of the said contra-rotating vortices and thus overcome the aforesaid drawbacks.

The present invention is more particularly, but not exclusively, applicable to an aircraft. In this case, the two lifting surfaces of a wing, each of which generates one of the said co-rotating eddies, are generally the surface of the wing tip on the one hand and a deployed flap on the other hand. However, the present invention may also be applied to other moving bodies, particularly a submarine, which creates vortices in the wake of its fins.

The said instability mode of the core to be excited is advantageously determined from the size of the cores of the eddies and the ratios between the sizes of the cores and the distance between the eddies. The said instability mode is preferably determined empirically. Generally, the wavelength of the instability mode is essentially equal to the mean diameter of the corresponding eddy core.

Additionally, and advantageously, the wavelength of a perturbation to be generated is:
- of the order of a divisor of the most unstable wavelength of the instability mode which it is to excite, permitting a reduction of the size of the means used to generate the said perturbation; and/or
- located within an instability range of each of the co-rotating eddies of the corresponding wing.

The present invention also relates to a device for accelerating the destruction of a pair of vortices such as those described above.

According to the invention, the said device is characterized in that it comprises, on each of the said wings, at least one perturbation means which is positioned in the vicinity of the area of creation of one of the said co-rotating eddies associated with the wing, and in that each of the said perturbation means can generate a periodic perturbation of the flow, which has a wavelength capable of exciting at least one of the said instability modes of the corresponding eddies in such a way as to increase the core of the contra-rotating vortex which is created by the merging of this eddy with the other co-rotating eddy in such a way that the diameter of the said core becomes greater than a predetermined proportion of the said inter-vortex distance.

Advantageously, at least one of the said perturbation means comprises:
- in a first embodiment, an unstreamlined element, for example a cylinder, whose apparent diameter which is transverse with respect to the flow depends on the wavelength of the periodic perturbation to be generated; and
- in a second embodiment, a means for producing a jet of fluid emitted transversely with respect to the said flow. If the said jet of fluid is emitted orthogonally to the flow, its velocity must be at least equal to that of the moving body and its diameter must be of the same order of magnitude as the apparent diameter of an unstreamlined element which could be used in its place.

The device according to the invention is therefore easily constructed and inexpensive. Moreover, it is passive and very robust.

Additionally, at least one of the said perturbation means is advantageously retractable. For this purpose, the said perturbation means is preferably retractable into the wing or into fairings fitted on the wing (the strut end fairing, for example) or into the flap. This avoids increasing the drag and thus avoids degrading the performance of the moving body, particularly in the absence of contra-rotating vortices, especially in cruising flight in the case of an aircraft.

The figures on the attached drawing clearly show a possible embodiment of the invention. In these figures, identical references indicate similar elements.

Figure 1:
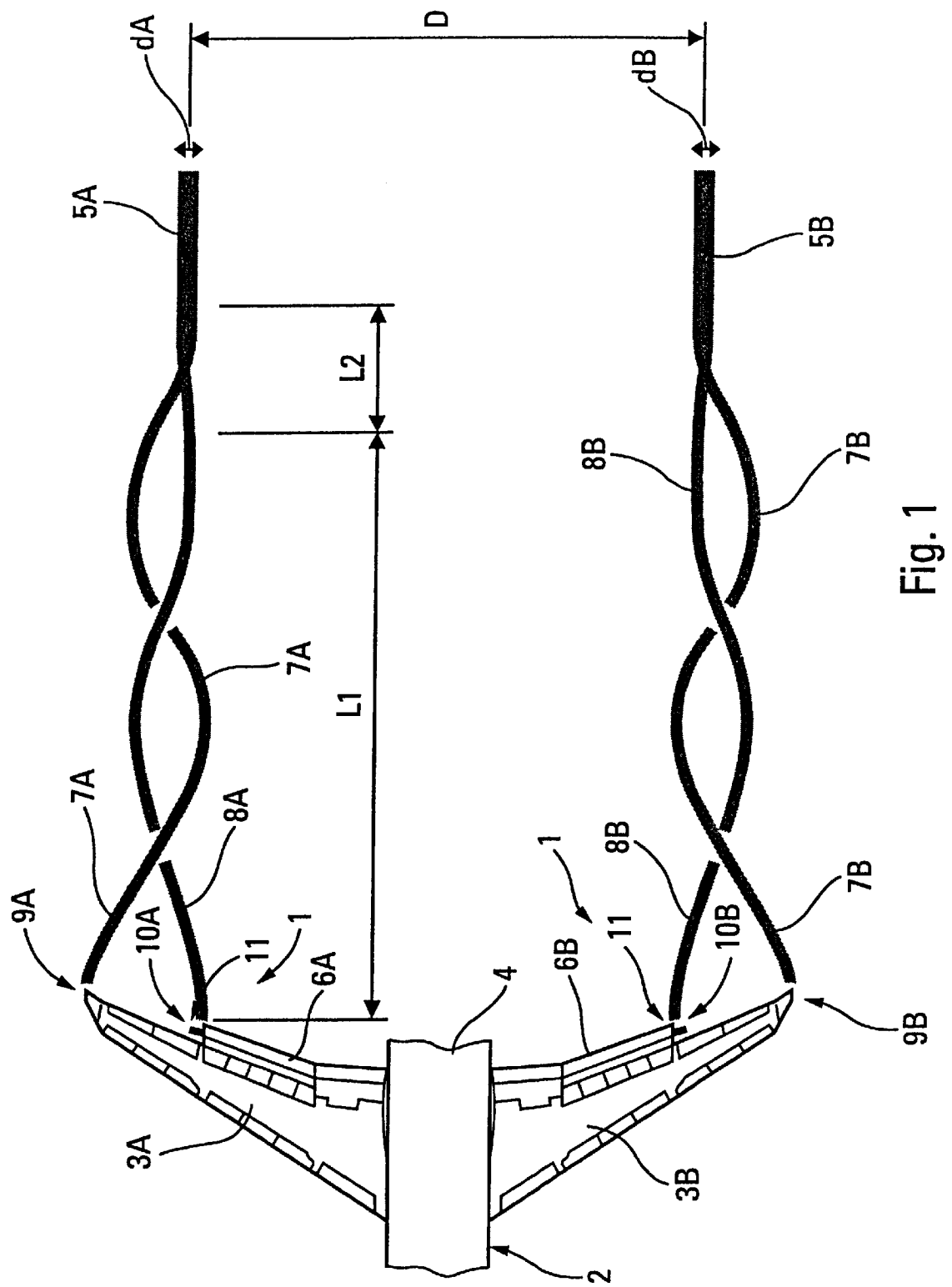
FIG. 1 shows in a partial and schematic way an aircraft to which a device according to the invention is applied.

The device 1 according to the invention, shown schematically in FIG. 1, is fitted on an aircraft 2, particularly a transport aircraft, of which only the two wings 3A and 3B and part of the fuselage 4 are shown, to accelerate the destruction of at least two contra-rotating vortices 5A and 5B which are created in the wakes of the said wings 3A and 3B respectively, and which are separated from each other by an inter-vortex distance D (the distance between the centres of the cores of the said vortices 5A and 5B).

It is known that the vortex 5A is formed at the rear of the wing 3A by the merging of at least two co-rotating eddies 7A and 8A, of which one 7A is created by the tip 9A of the wing 3A, and the other 8A is created by the tip of the said deployed flap 6A, each of the said co-rotating eddies 7A and 8A having a plurality of core instability modes, as specified below. The said co-rotating eddies 7A and 8A are maintained for a distance L1 before merging at a distance L2. Similarly, the vortex 5B is formed at the rear of the wing 3B by the merging of at least two co-rotating eddies 7B and 8B, of which one 7B is created by the tip 9B of the wing 3B and the other 8B is created by the tip of the deployed flap 6B.

These two contra-rotating vortices 5A and 5B, or more, which are created in the wake of the aircraft 2, can be very energetic and can produce a velocity field which is highly destabilizing for a following aircraft, and, in particular, may cause a powerful rolling moment and a powerful downward motion of the air. Moreover, they have a significant duration (several minutes), and therefore make it necessary to maintain large separation intervals between aircraft in the vicinity of airports.

According to the invention, in order to accelerate the destruction of the said vortices 5A and 5B, a periodic perturbation of the flow is generated on each of the said wings 3A and 3B, in the vicinity of the area 10A, 10B of creation of at least one 8A, 8B of the said co-rotating eddies 7A, 8A; 7B, 8B associated with the wing 3A, 3B. Each of the said periodic perturbations has a wavelength which can excite at least one, but preferably a plurality, of the instability modes of the corresponding eddy 8A, 8B in such a way as to increase the core of the contra-rotating vortex 5A, 5B which is created as a result of the unstable merging of this eddy 8A, 8B with the other eddy 7A, 7B, in such a way that the diameter dA, dB of the said core becomes greater than a predetermined proportion (preferably equal to 0.3 at least) of the said inter-vortex distance D. The term "unstable" is used to emphasize that the merging, in the presence of core instabilities, does not take place in the usual way.

To achieve this, the device 1 according to the invention has, on each of the said wings 3A, 3B, at least one perturbation means 11 or 12 specified below, which is positioned in the vicinity of the said area 10A, 10B of creation of one of the said co-rotating eddies 8A, 8B associated with the wing 3A, 3B, in other words in the vicinity of the tip of the flap 6A, 6B in the example of FIG. 1, and which can generate the said periodic perturbation of the flow.

The device 1 according to the invention therefore generates for each vortex 5A, 5B a perturbation which has a precise wavelength which is capable of exciting a maximum of unstable modes, particularly of what is known as the "elliptic" instability, of the corresponding eddy, for example of the eddy 8A associated with the tip of the flap 6A in the example of FIG. 1 for the wing 3A. This perturbation causes the core of the said eddy BA to oscillate and makes it unstable. The eddy 8A therefore shows perturbations of its internal structure.

As the merging of the eddy 8A with the eddy 7A (of the tip 9A of the wing 3A) progresses, the said highly perturbed eddy 8A contaminates the eddy 7A. The instability of the eddy 8A modifies the process of merging of the two eddies 7A and 8A. Consequently, the diameter dA of the vortex 5A resulting from the unstable merging of these eddies 7A and 8A is greater and its level of internal turbulence is higher than in the absence of instability.

This phenomenon is naturally the same for the vortex 5B resulting from the unstable merging of the two eddies 7B and 8B formed on the other wing 3B of the aircraft 2.

We are therefore left with two highly perturbed contra-rotating vortices 5A and 5B having large diameters dA and dB. As indicated above, provided that these diameters dA and dB are sufficiently great (in other words, that the ratios dA/D and dB/D are greater than a predetermined critical value (for example 0.3), or that dA and dB become greater than a predetermined proportion of the inter-vortex D, the said instabilities cause an exchange of fluid between the two vortices 5A and 5B by the creation of small scale secondary vortices (not shown), which are perpendicular to the axes of the said principal vortices 5A and 5B. This situation leads to a rapid disintegration of the pair of contra-rotating vortices 5A and 5B and a rapid decrease of the circulation of each vortex 5A, 5B. In other words, the vortices 5A and 5B are therefore destroyed much more rapidly than in the absence of instability.

Figure 4:
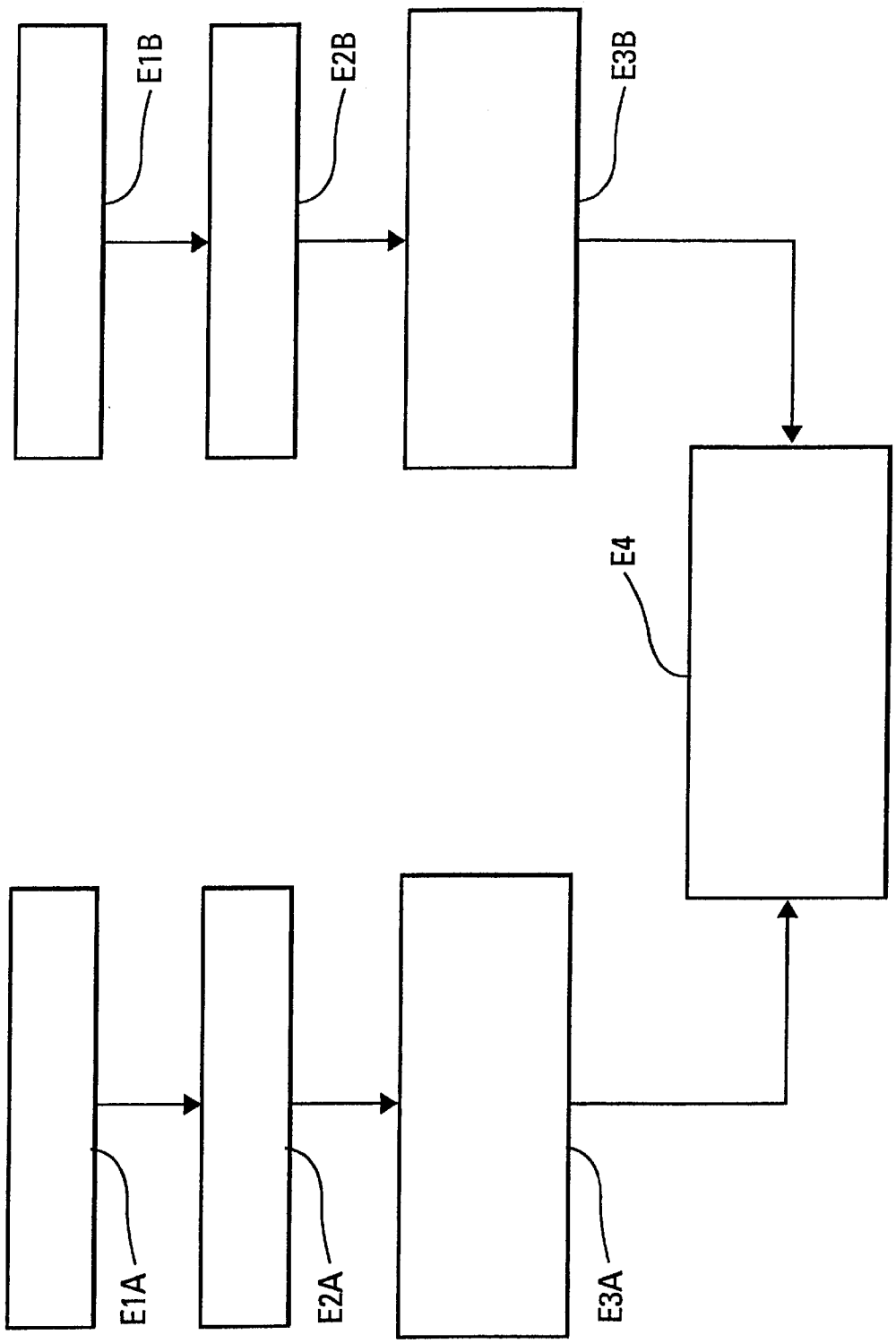
FIG. 4 is a synoptic diagram showing the principal stages of the acceleration of the destruction of the vortices, due to the application of the process according to the invention.

FIG. 4 shows the principal stages of the process described above, leading to the accelerated destruction of the vortices 5A and 5B of FIG. 1 by the action of the device 1 according to the invention. This process comprises the following stages (the letter A indicates a phenomenon or stage taking place in relation to the wing 3A and the letter B indicates the same phenomenon taking place in relation to the wing 3B):

in E1A and E1B, the aforesaid periodic perturbations generated by the action of the device 1 are shown, each corresponding to an instability known as a "Bénard-von Kármán instability";

in E2A and E2B, three-dimensional core instabilities, particularly "elliptic instabilities", present in the eddies 8A and 8B are increased by the periodic perturbations generated according to the invention.

It is known that these three-dimensional instabilities develop in an eddy subjected to stretching. This occurs in the case of pairs of co-rotating (or contra-rotating) eddies, the stretch in each eddy being induced by the presence of the other eddy, making the said eddy unstable. The ensuing instability produces perturbations of the internal structure of the eddy, with a characteristic axial wavelength of the order of the diameter of the eddy core.

Elliptic instability has been described:

in respect of contra-rotating eddies, by T. Leweke and C. H. K. Williamson, in their article "Cooperative elliptic instability of a vortex pair", published in J. Fluid Mech, vol. 360, pp. 85–119; and in respect of co-rotating eddies, by P. Meunier, T. Leweke and M. Abid, in their article "Three-dimensional instability of two merging vortices", published in "Advances in Turbulence VIII", CIMNE, pp. 15–18.

The elliptic instability significantly modifies the long-term development of the eddy pairs, in the case of both co-rotating eddies and contra-rotating eddies.

The principal phenomenon in the interaction of co-rotating eddies (7A and 8A on the one hand, 7B and 8B on the other hand) is the merging of the two eddies into a single vortex 5A, 5B, as soon as the cores of these co-rotating eddies, which increase over time by viscous or turbulent diffusion of the vorticity, exceed a critical fraction of the distance between the centres of the cores of these eddies;

these mergings, between 7A and 8A on the one hand, and between 7B and 8B on the other hand, take place at the stages E3A and E3B respectively.

Because of the instabilities (which have been amplified according to the invention) of the eddies 8A and 8B, the vortices 5A and 5B which are created by these unstable mergings have larger diameters dA and dB and higher internal turbulence levels than in the absence of amplification.

According to the invention, these diameters dA and dB are greater than a given proportion (for example, 0.3) of the inter-vortex D; and, due to diameters dA and dB of this size the non-linear regime of the instability between contra-rotating vortices causes (stage E4) an exchange of fluid between the two vortices 5A and 5B by the creation of small-scale secondary vortices, which are perpendicular to the axes of the principal eddies. This situation rapidly leads to a disintegration of the initial pair of vortices 5A and 5B due to a small-scale turbulent motion of the fluid and a marked and rapid decrease of the circulation of each vortex. The vortices 5A and 5B are therefore destroyed more rapidly.

According to the invention, the instability modes of the co-rotating eddies 8A and 8B, which are to be excited, are determined on the basis of the known theory of instability, partially described above, which has been confirmed by simulation and experiment. It will be noted that the parameters determining the instability modes are essentially the sizes (diameters) of the cores of the eddies 7A, 7B, 8A, 8B before merging and the ratio of the core size to the distance between these eddies. The variation of the Reynolds number (expressing the effect of the viscosity of the fluid) has practically no effect in the case of application to an aircraft.

Additionally, the most unstable wavelengths of the instability modes can be determined by the theory of elliptic instability, on the basis of the above parameters. However, these predictions yield only an order of magnitude for the case in question. The most unstable wavelengths are of the order of the mean diameter of the corresponding eddy core. The precise values in each case in question must be found empirically. The perturbations to be generated must have wavelengths close to that of the instability mode, or at least close to a divisor of this wavelength.

Additionally, according to the invention, the wavelength of a perturbation to be generated is located in an instability range of each of the co-rotating eddies of the corresponding wing.

As indicated above, the device 1 according to the invention has at least two perturbation means, each of which can be made in different embodiments 11, 12.

Figure 2:
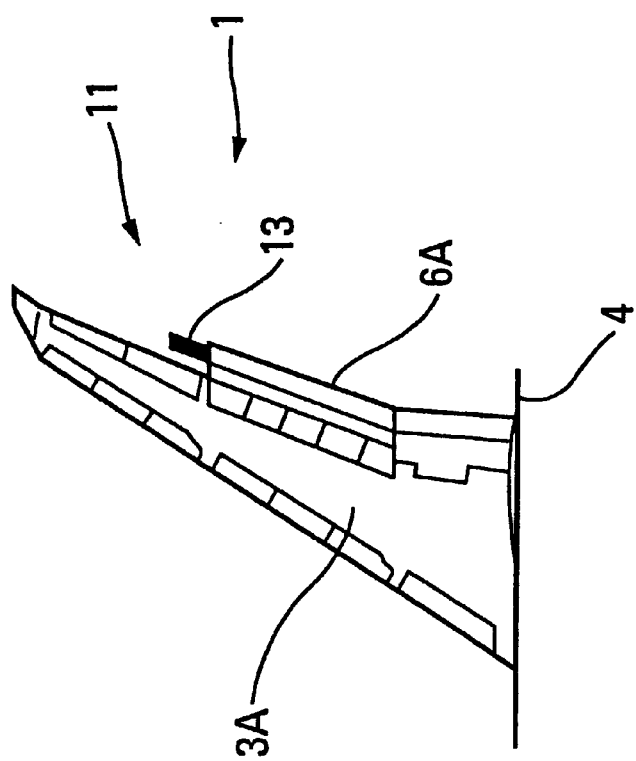

In a first embodiment shown in FIG. 2, the said perturbation means 11 has an unstreamlined element 13, whose "apparent" or "effective" diameter, which is transverse with respect to the flow, depends on the wavelength of the periodic perturbation to be generated.

Preferably, this unstreamlined element 13 is a cylinder, of circular section for example, as shown in FIG. 2. However, this cylinder can also have an elliptical section or any other section. The element can also be a flat plate with a high angle of incidence, inclined at 45° for example.

The "effective" transverse dimension (or width) of the element 13 therefore determines the wavelength of the generated perturbation. This "effective" width depends on the degree of deviation of the stream lines by the element 13. It is not necessarily identical to the real dimension of the element 13. For example, a flat plate perpendicular to the flow deviates the stream lines much more than a cylinder having the same diameter. Additionally, the relation between the "effective" dimension and the wavelength of the generated wake is known for a certain number of elements on a purely empirical basis: there is no theoretical result. The wavelength is of the order of several times the "effective" width of the element. Thus it is possible to have an approximate idea of the size of the element 13 in advance, but the relation has to be newly determined on an empirical basis for each shape used.

With respect to the present invention, the said element 13 can therefore be any (unstreamlined) element which serves to generate the aforesaid periodic perturbation of the flow.

Additionally, this element 13 is retractable. For this purpose, it is preferably retractable into the wing 3A, 3B or into the flap 6A, 6B, or into existing fairings in the proximity of which it is fitted, with the use of ordinary retraction means which are not shown. This avoids an increase in drag and thus avoids degradation of the performance of the aircraft 2, particularly in cruising flight.

Figure 3:
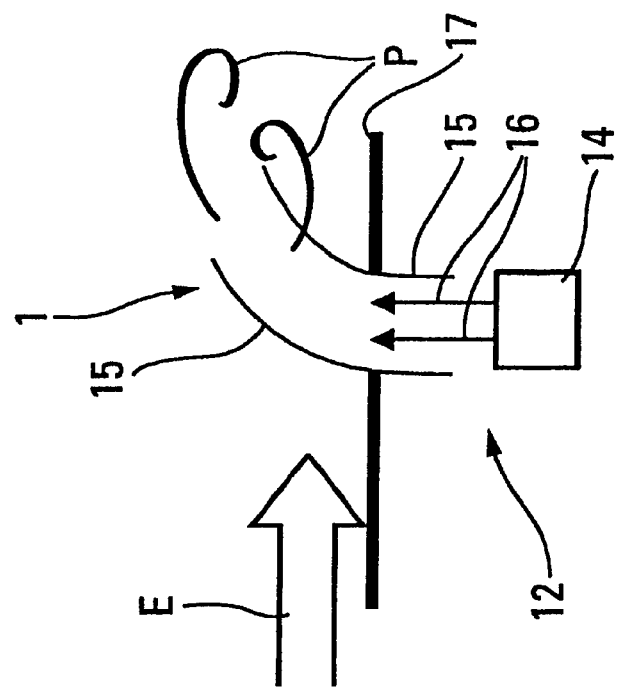
FIGS. 2 and 3 show, respectively, two different embodiments of a perturbation means of a device according to the invention.

In a second embodiment shown schematically in FIG. 3, the said perturbation means 12 has a means 14 of an ordinary type for producing a jet of fluid 15, as indicated by the arrows 16. This jet of fluid 15 is emitted transversely with respect to the flow E in such a way as to generate the perturbation P according to the invention, as shown in a partial way. If the said jet of fluid 15 is emitted orthogonally to the flow E, its velocity must be at least equal to that of the aircraft 2 and its diameter must be of the same order of magnitude as the apparent diameter of an unstreamlined element 13 which could be used in its place.

Preferably, the said means 14 is positioned inside the existing structure 17 in the proximity of the said creation area 10A, 10B, for example inside the flap 6A, 6B or the wing 3A, 3B. If this is not the case, the said means 14 can also be retractable.

As indicated above, the perturbation means 11, 12 must be chosen in such a way as to produce a perturbation with a wavelength which can excite a maximum of unstable modes of the elliptic instability of the co-rotating eddies.

By way of illustration, an example of apparent or effective (transverse) diameter (which may be either the apparent diameter of the unstreamlined element 13 or the "apparent diameter" of the jet of fluid 15) is of the order of 10 cm, generating a perturbation having a wavelength of approximately 50 cm. A representative radius of the wing tip or flap tip eddy before merging may be of the order of 1 meter (m), giving a maximum wavelength of the elliptic instability of the order of 3 m, to which many lower unstable wavelengths are to be added. The perturbation generated by the device 1 can excite the modes which have the same wavelength, but also all those close to the multiples. In the example in question, the perturbation created by the device 1 would excite the modes having wavelengths of 50 cm, 1 m, etc., up to 3 m (above this length, the eddies are stable), in other words a maximum of six unstable modes.

It will be noted that the device 1 according to the invention has at least one perturbation means 11, 12 for each vortex 5A, 5B. Clearly, it may equally well have two (or more) of these means, in which case one acts on the wing tip eddy and the other on the flap tip eddy. If it only has one means for each vortex, then preferably, but not exclusively, this perturbation means acts on the eddy 8A, 8B associated with the tip of the flap 6A, 6B, which is more energetic, because the distribution of lift is different and more favourable to eddy generation, than the eddy 7A, 7B associated with the tip 9A, 9B of the wing 3A, 3B.

Clearly, the said device 1 can be used to accelerate the destruction of more than two vortices, if an appropriate number of perturbation means 11, 12 is provided.

It will also be noted that the said device 1 according to the invention is passive, simple, robust and inexpensive.

The present invention can be applied to any moving body trailing vortices in the wake of its wings (in the widest sense of the word), and in particular to a submarine in order to make its detection, particularly by satellite, more difficult.

What is claimed is:

1. A process for accelerating destruction of at least two contra-rotating vortices which are created, respectively, in the wake of the wings of a moving body having at least two wings, where each wing has at least two lifting surfaces, and which are separated from each other by an inter-vortex distance, each of said contra-rotating vortices being formed at the rear of the corresponding wing by the merging of at least two co-rotating eddies which are created by the arrangement of said lifting surfaces of the wing, each of said co-rotating eddies having a plurality of core instability modes, said method comprising:

generating a periodic perturbation, corresponding to a Benard-von Karman instability, of the flow on each of said wings, in the vicinity of the area of creation of at least one of said co-rotating eddies associated with the wing;

exciting, in accordance with a wavelength of each of said periodic perturbations, at least one of said instability modes of the corresponding eddy; and increasing, by said excitation, the core of the contra-rotating vortex, which is created by the unstable merging of this eddy with the other eddy, so that the diameter of said core becomes greater than a predetermined proportion of said inter-vortex distance.

2. A process according to claim 1, wherein said instability mode to be excited is determined from the sizes of the cores of the eddies and from the ratios between the core sizes and the distance between the eddies.

3. A process according to claim 1, wherein the wavelength of the instability mode is essentially equal to the mean diameter of the core of the corresponding eddy.

4. A process according to claim 1, wherein the wavelength of a periodic perturbation to be generated is of the order of a divisor of the most unstable wavelength of the instability mode which it is to excite.

5. A process according to claim 1, wherein the wavelength of a periodic perturbation to be generated is located within an instability range of each of the co-rotating eddies of the corresponding wing.

6. A device for a moving body having at least two wings, where each wing has at least two lifting surfaces, for accelerating the destruction of a pair of contra-rotating vortices which are created, respectively, in the wake of said wings of the moving body and which are separated from each other by an inter-vortex distance, each of said contra-rotating vortices being formed at the rear of the corresponding wing by the merging of at least two co-rotating eddies which are created, respectively, by the arrangement of said lifting surfaces, each of said co-rotating eddies having a plurality of instability modes, said device comprising, on each of said wings, at least one perturbation means which is positioned in the vicinity of the area of creation of one of said co-rotating eddies associated with the wing, wherein each of said perturbation means is operable to generate a periodic perturbation of the flow that corresponds to a Benard-von Karman instability, which has a wavelength operable to excite at least one of said instability modes of the corresponding eddy in such a way as to increase the core of the contra-rotating vortex which is created by the unstable merging of this eddy with the other eddy in such a way that the diameter of said core becomes greater than a predetermined proportion of said inter-vortex distance.

7. A device according to claim 6, wherein at least one of said perturbation means comprises an unstreamlined element, whose effective diameter which is transverse with respect to the flow depends on the wavelength of the periodic perturbation to be generated.

8. The device of claim 7 wherein the unstreamlined element is a cylinder.

9. A device according to claim 6, wherein at least one of said perturbation means comprises a means for producing a jet of fluid emitted transversely with respect to said flow.

10. A device according to claim 6, wherein at least one of said perturbation means is retractable into said wing.

* * * * *